United States Patent [19]
Flowers et al.

[11] Patent Number: 5,802,524
[45] Date of Patent: Sep. 1, 1998

[54] METHOD AND PRODUCT FOR INTEGRATING AN OBJECT-BASED SEARCH ENGINE WITH A PARAMETRICALLY ARCHIVED DATABASE

[75] Inventors: Philip Lester Flowers, Morgan Hill, Calif.; Stefan Raimund Orban, Herrenberg, Germany; Roland Seiffert, Morgan Hill, Calif.; Thomas S. Lee, San Jose, Calif.; Mandy L. Wang, Saratoga, Calif.

[73] Assignee: International Business Machines Corporation, Armonk, N.Y.

[21] Appl. No.: 688,121

[22] Filed: Jul. 29, 1996

[51] Int. Cl.$^6$ ............................................. G06F 15/40
[52] U.S. Cl. .................... 707/103; 707/103; 707/104; 395/154
[58] Field of Search ..................... 707/104, 6–103; 395/145, 154; 348/13; 364/419.19

[56] References Cited

U.S. PATENT DOCUMENTS

| | | | |
|---|---|---|---|
| 4,961,139 | 10/1990 | Hong et al. | 707/1 |
| 4,967,341 | 10/1990 | Yamamoto et al. | 707/2 |
| 5,168,533 | 12/1992 | Kato et al. | 382/54 |
| 5,375,235 | 12/1994 | Berry et al. | 707/5 |
| 5,379,420 | 1/1995 | Ullner | 707/6 |
| 5,444,823 | 8/1995 | Nguyen | 395/51 |
| 5,487,132 | 1/1996 | Cheng | 395/63 |
| 5,493,677 | 2/1996 | Balogh et al. | 707/104 |
| 5,550,965 | 8/1996 | Gabbe et al. | 707/512 |
| 5,649,185 | 7/1997 | Antognini et al. | 707/200 |
| 5,655,117 | 8/1997 | Goldberg et al. | 707/102 |
| 5,659,732 | 8/1997 | Kirsch | 707/5 |

*Primary Examiner*—Thomas G. Black
*Assistant Examiner*—Shahid Alam
*Attorney, Agent, or Firm*—Sughrue, Mion, Zinn, Macpeak & Seas, PLLC

[57] ABSTRACT

The invention relates to directing one or more object-based search engines to an object store, which stores information archived according to parametric classifiers. In order for the object-based search engine to access the objects, a special index class, in the form of a SQL table is created. The index class comprises attributes of a part number, an object identification number, an item identifier, a search state attribute, and a search engine identifier, an object being assigned a corresponding value for each attribute and each object being uniquely identified by the item identifier attribute. The search engine is activated depending on the type of data object to be indexed, in accordance with the search state attribute the catalog table. A computer readable medium is provided with program code to implement the above integration.

14 Claims, 3 Drawing Sheets

METHOD AND PRODUCT FOR INTEGRATING AN OBJECT-BASED SEARCH ENGINE WITH A PARAMETRICALLY ARCHIVED DATABASE

FIELD OF THE INVENTION

The present invention relates to a method and means of integrating a search engine with an object store. More particularly, the invention relates to directing one or more object-based search engines to an object store, which stores information archived according to parametric classifiers.

BACKGROUND OF THE INVENTION

Existing multimedia databases have been formed in which the information is classified into one or more categories as defined by a database programmer as data is input to an object store. A conventional search mechanism allows a user to search the database for a desired document using queries based on these parameters.

An example of a conventional database and associated store and retrieval mechanism is shown in FIG. 1. A client 10, which may be remotely located from the physical storage facility, sends a request to a library server 20 for document retrieval. Upon verification of the client's library privileges, the library server accesses a library catalog 21, which stores parameter-value pairs associated with the objects stored in the database. The library catalog identifies groups of objects, corresponding to an item number, that coincide with the subject matter of the request and also identifies individual objects, identified by a part number, within the grouping. Based on the request sent by the client and object-parameter pairs stored in the catalog, the library catalog determines which object(s) corresponds to the client request. This implements the parametric search function described above.

The library server may operate in a mainframe environment such as IBM MVS/ESA running under CICS, or alternatively may operate in a LAN based system running under the OS/2 and AIX operating systems. The library catalog can be implemented as a relational database using a structured query language (SQL) table. IBM DATABASE 2 (DB2) is one example for implementation of the catalog table. The library catalog further determines where the desired object is stored in one or more object stores 31, 41. Once the library catalog identifies the object store corresponding to the request, this information is passed back to the library server. The library server sends a request to the appropriate object server 30, 40 to retrieve the desired information from the object stores. The object servers then send information to the requesting client. The object servers may also be implemented in either a mainframe or LAN environment, and the object store is also arranged as a SQL table.

The client and servers are interconnected through communications isolators 15, 25, 35, and 45, which allows each to operate without regard to the underlying communications protocol. Appropriate acknowledgements are returned over the communications network during each stage of the processing.

If the library client desires to "check out" the retrieved information, the object may be stored in the local client cache 11. This obviates the need to transfer binary large objects over the communications network and allows more rapid access. It is noted that the client may also input new information to the database. In this case, the library server determines whether the client is authorized to perform this function, and new entries are correspondingly made in the catalog and object stores. In this case, the object server sends an acknowledgment to the client that the newly entered data has been stored and archived.

The conventional arrangement described above requires a user to have knowledge and familiarity with the way in which the objects in the database have been classified to locate a desired item of stored information. Specifically, the user must have specific knowledge of how objects are arranged according to item number and part number to locate a document quickly. This constrains the search capability of the conventional system. Comprehensive object-based search engine apparatus and techniques are known, which are not limited to searches based on parametric classifiers. IBM Search Manager is such a search engine. Search Manager allows a database to be searched based on text strings and variants of a desired text string occurring in a stored object itself, rather than on the classification associated with the object. Other object-based search engines for performing text and graphic searching such as 2 BIC are also known. However, these more powerful and flexible search engines cannot presently be integrated with the existing databases which store information based on a particular classification scheme.

SUMMARY OF THE INVENTION

The object of the present invention is to provide a method in which a comprehensive object-based search engine can be integrated with an object store containing information classified with predetermined parameters. To achieve this object, there is provided a method for integrating one or more object-based search engines with an object store to process objects storable therein, wherein the search engine operates on the arrangement of at least one of: character and pixel information of said objects, and wherein the object store contains objects archived using parametric classifiers, each object being associated with at least one of a: part number and an object identification number, said method comprising the steps of:

generating an index class, said index class comprising attributes of a part number, an object identification number, an item identifier, and a search engine identifier, an object being assigned a corresponding value for each attribute and each object being uniquely identifiable by said item identifier attribute;

obtaining an object storable in said object store associated with at least one of a: predetermined part number and object identification number to obtain a selected object;

setting said search engine attribute according to the data type of said selected object;

activating a search engine corresponding to said search engine attribute; and processing said selected object with said activated search engine, wherein said search engine operates on the arrangement of at least one of: said character and pixel information of said selected object.

There is further provided a computer usable medium having computer readable program code means embodied therein for integrating one or more object-based search engines with an object store to process objects storable therein, wherein the search engine operates on the arrangement of at least one of: character and pixel information of said objects, and wherein the object store contains objects archived using parametric classifiers, each object being associated with at least one of a: part number and an object identification number, the computer readable program code means comprising:

computer readable program code means for generating an index class, said index class comprising attributes of a part number, an object identification number, an item identifier, and a search engine identifier, an object being assigned to a corresponding value for each attribute and each object being uniquely identifiable by said item identifier attribute;

computer readable program code means for obtaining an object storable in said object store associated with at least one of a: predetermined part number and object identification number to obtain a selected object;

computer readable program code means for setting said search engine attribute in said index class according to the data type of said selected object;

computer readable program code means for activating a search engine corresponding to said search engine attribute;

computer readable program code means for directing said activated search engine to said selected object; and computer readable program code means for processing said selected object according to the arrangement of at least one of: said character and pixel information of said selected object.

BRIEF DESCRIPTION OF THE DRAWINGS

The objects and advantages of the present invention are set forth below in a detailed description of a preferred embodiment of the present invention with reference to the accompanying drawings in which.

DETAILED DESCRIPTION OF THE INVENTION

Figure 1:
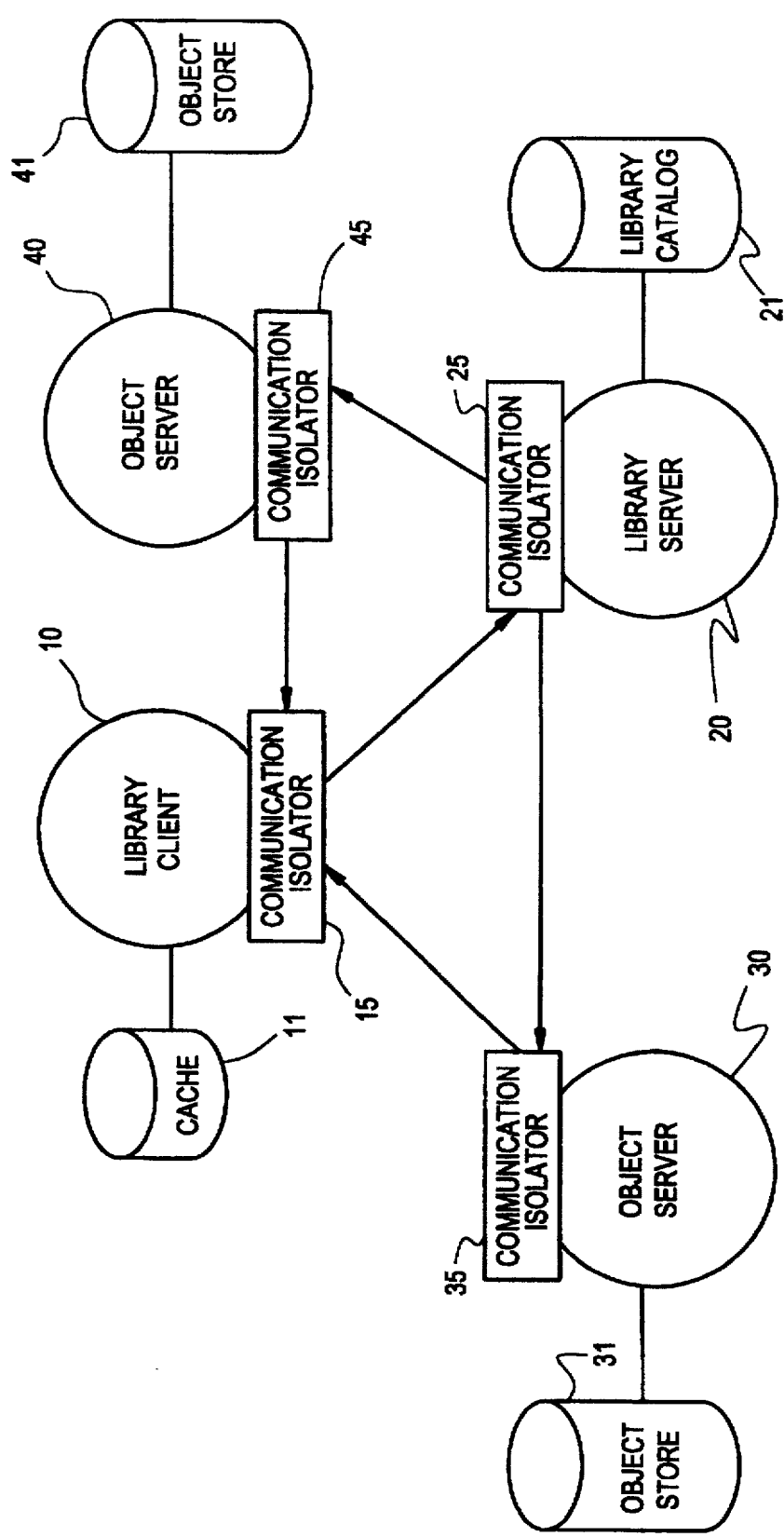
FIG. 1 illustrates a conceptual diagram of a conventional database arrangement in which searching is conducted based on parametric classification.
Figure 3:
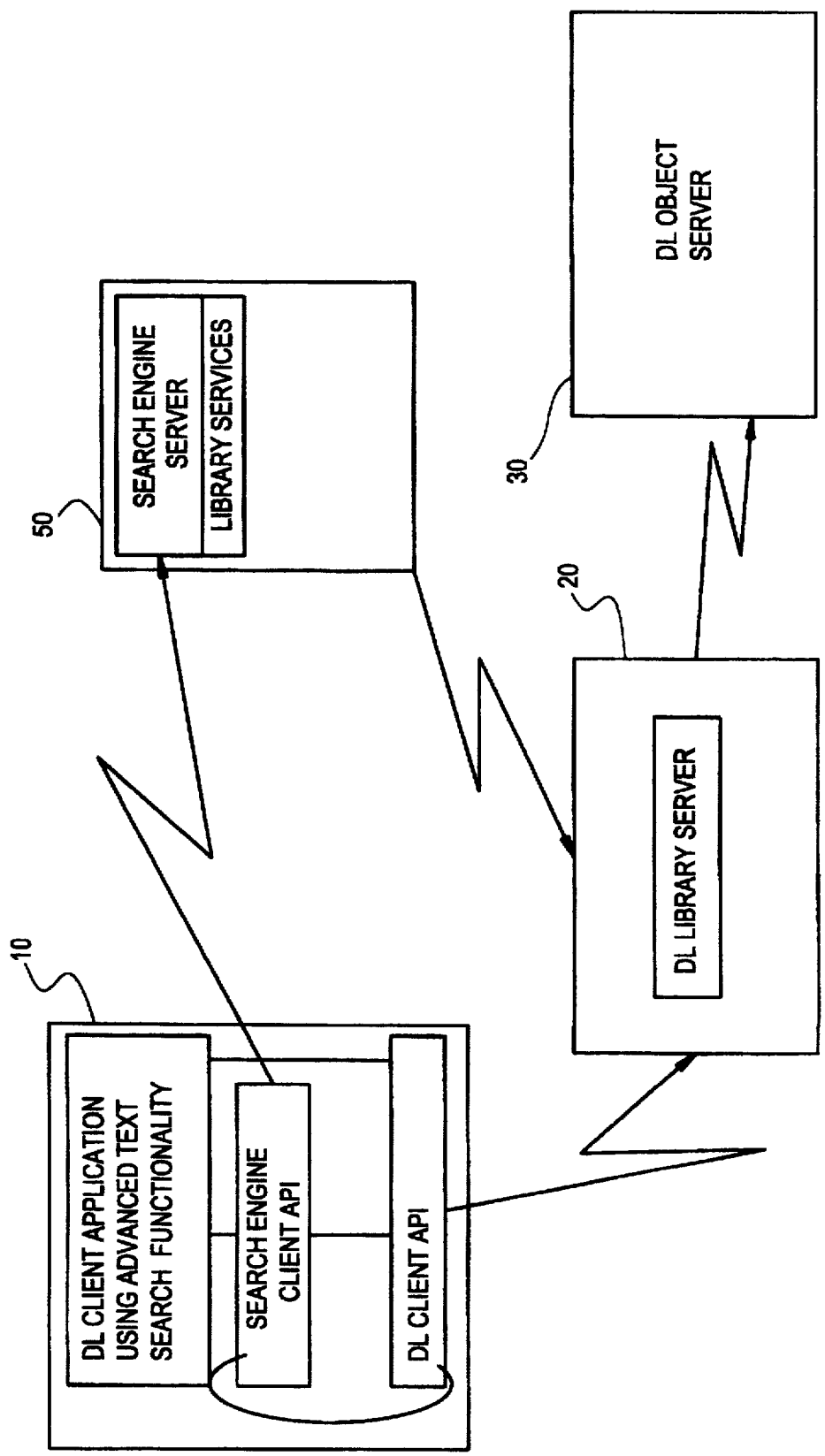
FIG. 3 illustrates a conceptual diagram of the flow of information to integrate an object-based search engine to a parametrically archived database using the method of the present invention.

When an object-based search engine is integrated into the conventional database arrangement of FIG. 1, the system has the structure shown in FIG. 3. The same reference numerals are used to indicate similarity between structures in FIG. 1 and FIG. 3. The client 10 interfaces with both the library server 20 for the parametric search and the external search engine 50, which operates on the object contents. Communication links are also provided between the external search engine and the object stores through the client and object servers.

The external search engine 50 interfaces directly with Folder Manager API's of the Digital Library through the DL client. The search engine performs searching based according to its own search algorithm, operating independently of the DL Library Server. The communication between the library server and the external search engine via the DL Library Client allows the external search engine to remain apprised of the additions, deletions, and editing of stored objects. When such status information is received, the search engine accesses the modified object to index new information or re-index objects based on edits and/or deletions. In this manner, subsequent searches are performed on the most current information.

There are many known mechanisms for performing the object-based search. These mechanisms will not be explained here, as the present invention relates to the integration of a flexible search engine into a system where one previously was unavailable. The present invention may be implemented regardless of the specifics of the search engine operation.

Figure 2:
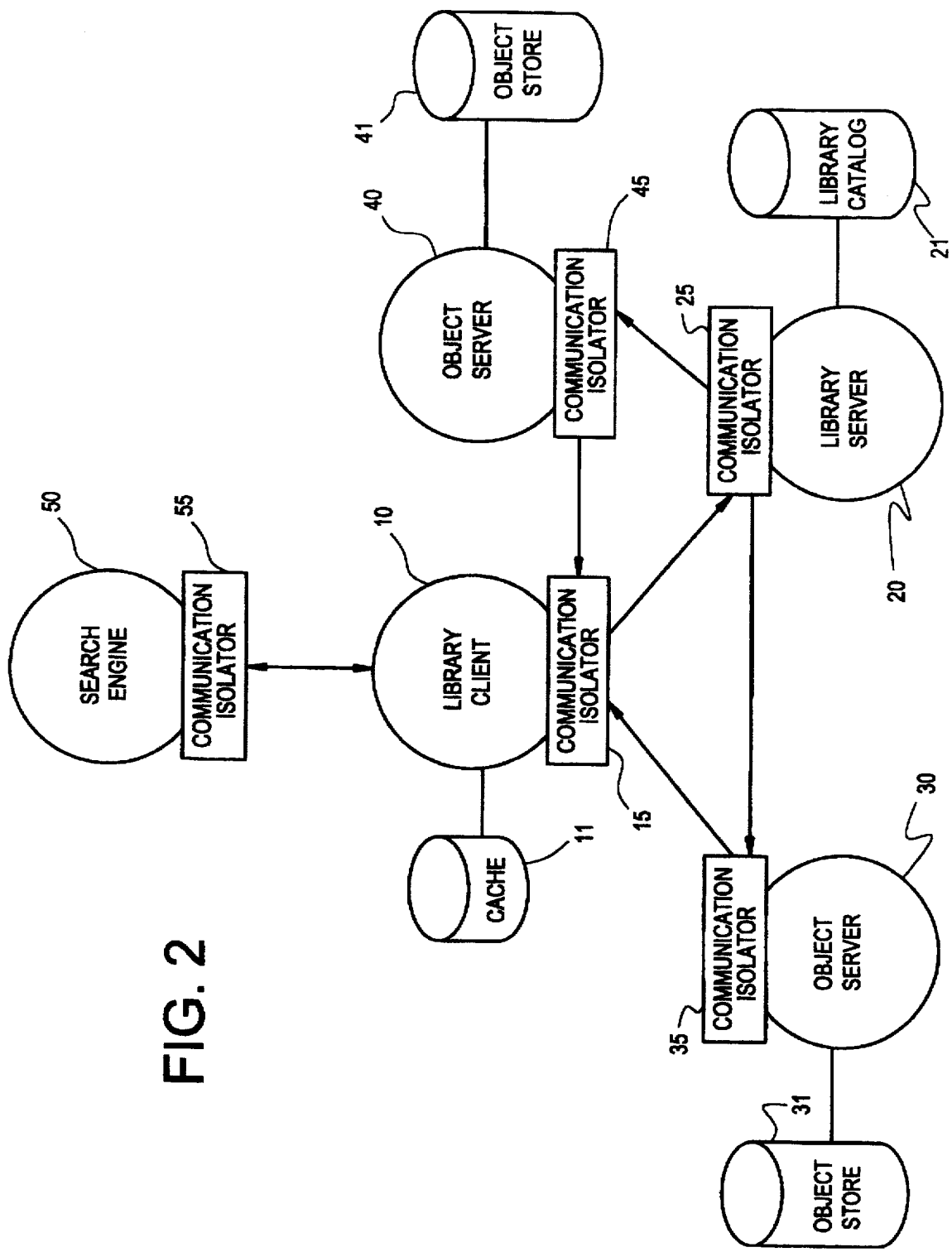
FIG. 2 illustrates a conceptual diagram of the arrangement where an object-based search engine is integrated with an object store containing parametrically archived information.

While the present invention provides a method and means to import several types of comprehensive search engines to a database structured for parameter searches, a preferred embodiment will be described in reference to the integration of the object-based engine Search Manager (SM) with the database Digital Library (DL). The high level integration is similar to shown in FIGS. 2 and 3.

In order for Search Manager to access the objects, a method and means must be provided which allows communication between Search Manager and the object stores. Search Manager performs text searching using index classes. In order to integrate Search Manager with the objects, a special index class is created. Search Manager acts on this newly created index class to index the object store information contained in the class.

Creation of the Index Class

The index class comprises a SQL table in which the columns represent attributes associated with each object archived in the index class, and in which the rows correspond to the objects. The SQL table has the structure shown below and may be implemented using several database formats including DB2 and ORACLE.

TABLE 1

The Search Index Class

| Item ID | Search Engine | Search Index | Search State | Text Item ID | Text Part No | Time Stamp | Search Info |
|---|---|---|---|---|---|---|---|
| i1 | SM | SMIDX1 | tobeup-dated | p1 | psz1 | basic | DEU |
| i2 | SM | SMIDX1 | queued | p2 | psz2 | update time | ENU |
| i3 | SM | SMIDX1 | indexed | p3 | psz3 | update time | DEU |
| i4 | OTHER | FUNNY IDX | tobeup-dated | p4 | psz4 | basic | ENG |
| i5 | OTHER | FUNNY IDX | weirdstate time | p5 | psz5 | update | CHT |
| i6 | SM | SMIDX2 | tobede-leted | p6 | psz6 | basic | FRA |
| . | | | . | . | | | |
| . | | | . | . | | | |
| in | | | | pn | pszn | | |

Column ItemID corresponds to a unique identifier for the object data indexed by the catalog.

Column SearchEngine identifies which search engine will be used to index or is search the object. For Search Manager, the attribute SearchEngine="SM". Other values may also be used.

Column SearchIndex corresponds to the index within the search engine will be used to index the object. For Search Manager, the value of this field will be SMServerSMIndex.

Column SearchState indicates the type of processing that is to be performed on the row object. SearchState may assume basic values corresponding to To_Be_Deleted, To_Be_Added, and To_Be_Updated. The inclusion of the search state attribute allows the index class to be updated according to data changes made in the object store such that referential integrity may be maintained between the contents of the index on which a parametric search is performed, and the objects of the index class on which the more comprehensive search may be performed. For Search Manager, the corresponding codes for the SearchState attribute is as follows.

| | |
|---|---|
| SIM_SEARCH_STATE_TOBEUPDATED | 0 × 100 |
| SIM_SEARCH_STATE_TOBEDELETED | 0 × 200 |
| SIM_SEARCH_STATE_QUEUED_DELETE | 0 × 301 |
| SIM_SEARCH-STATE_QUEUED_UPDATE | 0 × 302 |
| SIM_SEARCH_STATE_INDEXED | 0 × 400 |
| SIM_SEARCH_STATE_ERROR | 0 × FFF |

Column TextItemID corresponds to an identifier of a set of objects that satisfies a particular parameter in the parametric search. In Digital Library, objects corresponding to an item are managed by a Folder Manager and Library Client application program interface (API). The parameters p1 ... pn are identifiers corresponding to the location in the object store where sets of objects associated with the TextItemID value are stored. These identifiers direct Search Manager to the object store so that the set of objects may be processed according to the SearchState attribute.

The TextPartNo corresponds to an individual object that satisfies the parameter corresponding to the TextItemID in the parametric search. The TextPartNo, in turn, directs Search Manager to an individual object so that a string search may be made on the object. The parameters psz1 ... pszn are identifiers corresponding to object store locations holding the object associated with the particular TextPartNo and TextItemID. These identifiers direct the object-based search engine to the object store so that the particular object may be processed.

Column TimeStamp corresponds to a time identifier for an object and is also used to ensure referential integrity. The time stamp is set to the NULL value when Digital Library operates to index items added to the object store. The TimeStamp is set to a current Digital Library time upon activation of Search Manager. It is noted that the Search Manager may be periodically "pushed" using a known SM user_exit call or the Search Manager may be periodically "pulled" to self-activate. When a request is made to add, delete or update an object to be indexed by Search Manager, the TimeStamp attribute for that object is set to a non-NULL value so the Search Manager recognizes that the object requires updating. The changes between the NULL and non-NULL states of the TimeStamp attribute allows the Search Manager to track when modifications are being made to the object, especially in the case when successive updates are requested in Digital Library while the external search engine is performing re-indexing.

Column SearchInfo, in Search Manager, corresponds to a three character language code of the text which is indexed by Search Manager.

The SQL table can be created using conventional database tools. As a specific example, the above index class may be created using the DL API Ip2CreateClass or LibDefineIndexClassO. The details of the operation and parameters for these API's are set forth in VI ImagePlus Applications Programming Reference, Version 1 (1995) (hereinafter "VI Reference"), which is incorporated by reference.

Ip2CreateClass is a Folder Manager API available in DL Library for creating a user defined index class for use by the library server.

LibDefineIndexClass is a Library Client API available in DL Library for creating, changing, or deleting an index class.

Alternatively, the above index class of Table 1 may be created using the SysAdmin graphic user interface available with Digital Library operating on OS/2. Objects, which are stored in or added to the object stores, are made available to an external search engine through the above index class. It is noted that using the above index table, several different external search engines may be linked to the object stores by setting other values for the SearchEngine attribute. Thus, this implementation of the catalog table expands the search capability on these stored items, which were previously archived and searchable using only the particular parameters recognized by the DL library catalog.

Maintaining the Index Class

The index class must also provide a way to update the index class according to the changes in the contents of the object store. More particularly, the index class upon which the Search Manager acts must indicate when a particular object has been created, updated, or deleted to maintain referential integrity between the object store and the index class.

It is noted that the Digital Library contains its own procedures for updating the information contained in the object stores, specifically, API's SimLibCreateItem and SimLibWriteAttr. However, the sole reliance on these existing procedures to maintain the new search class will allow slippage in referential integrity between the object stores and the contents of the new index class. In order to prevent such slippage, three new procedures to create, delete, and update the index class are created once the index class is defined similar to Table 1. The new procedures for maintaining referential integrity are based on existing API's available in Digital Library.

Adding an Object to the Index Class

When a client requests an object to be added to the object store, the index class must be correspondingly updated. This function is performed by calling the new API SimLibCreateItemPartExtSrch which sets SEARCH STATE=SIM_SEARCH_STATE_TOBEUPDATED and the attribute TimeStamp=NULL. The API is based on the existing API's used by Digital Library's object server.

The parameters for SimLibCreateItemPartExtSrch largely overlap with the parameters for the DL API's SimLibCatalogObject, SimLibStoreNewObject, and SimLibCreateItem. These DL API's are briefly described as follows.

SimLibCatalogObject stores a new object from an existing file.

SimLibStoreNewObject stores a new object from memory.

Once the object is obtained either from a file or from memory, SimLibCreateItem creates a row in the index class for the added object.

API SimLibCreateItemPartExtSrch operates on the following parameters. The parameters defined for Digital Library include the conventional data types defined for OS/2 VisualAge C++, Version 3 and IBM C SET++ for AIX, Version 3. Details are

| | |
|---|---|
| ULONG | (HSESSION HSession, |
| SimLibCreateItemPartExtSrch | PATTRLISTSTRUCT pAttributeList, |
| | USHORT usNumOfAttrs, |
| | USHORT usIndexClass, |
| | PITEMID pszItemID, |
| | HOBJ hObj, |
| | ULONG ulConCls, |
| | ULONG ulAffiliatedType, |
| | PVOID pAffiliatedData, |
| | PSZ pszFullFilename, |
| | PVOID PObjBuffer, |
| | ULONG ulObjSize, |
| | PSZ pszSearchEngine, |
| | PSZ pszSearchIndex, |
| | BOOL bCallExtSrch, |
| | PRCSTRUCT pRC) |
| HSESSION hSession: | library session identifier, created by API SimLibLogon which verifies client access and privileges |
| PATTRLISTSTRUCT | |
| pAttributeList: | pointer to an array of ATTRLISTSTRUCT defining the index class created to integrate the object-based search engine |
| USHORT usNumOfAttrs: | number of in pAttributeList array |
| USHORT usIndexClass: | index class |
| PITEMID pszItemID: | pointer to item ID of preexisting ITEM uniquely identifies an object in the index class |
| HOBJ hObj: | pointer to object handle block, corresponds to the part number and text item id number as designated in the object store |
| ULONG ulConCls: | content of class id |
| ULONG ulAffiliatedType: | type of affiliated object |
| PVOID pAffiliatedData: | pointer to data structure |
| PSZ pszFullFilename: | pointer to filename |
| PVOID pObjBuffer: | pointer to memory buffer |
| ULONG ulObjSize: | size of object |
| PSZ pszSearchEngine: | pointer to name of Search Engine |
| PSZ pszSearch Index: | pointer to Search Index |
| BOOL bCallExtSrch: | if TRUE, call SimLibProcExtSrch which will activate the object-based search engine to update the index class |
| PRCSTRUCT prc: | a return code to confirm that API call is successful |

The conditions on the following parameters should be noted when using the above-listed object server API's to implement SimLibCreateItemPartExtSrch.

The parameters pszItemID and (pAttributeList, usNumOfAttrs, usIndexClass) are mutually exclusive. Pointer pszItemID should be used if an Item for the object already exists. The parameters (pAttributeList, usNumOfAttrs, usIndexClass) should be used to create the Item. Any parameters not used should be NULLed.

The parameters pszFullFilename and (pObjBuffer and ulObjSize) are mutually exclusive. Pointer pszFullFilename should be used for an object obtained from a file on disk. The parameters (pObjBuffer and ulObjSize) should be used for an object obtained from memory. Any parameters not used should be NULLed.

The parameters hObj, ulConCls, ulAffiliatedType, pAffiliatedData are used by SimLibCatalogObject or SimLibStoreNewObject depending on the source for the new object, i.e. from an existing file or from memory.

The pointers pszSearchEngine and pszSearchIndex are used to provide values for the column attributes SearchEngine and SearchIndex to complete an object row in the catalog table.

If this application sets bCallExtSrch to FALSE, the API can either depend on the "pull capability" of the Search Manager to self-activate periodically or invoke the new API SimLibProcExtSrch at a later time to index the new item using the object-based search engine.

Parameters for pre-existing API's also have the conditions that pAsyncCtl must be NULL and pSMS must be NULL. For SimLibCreateItem, the parameter usItemType must be SIM_DOCUMENT. For SimLibCatalogObject: fCreateControlBITS must be SIM_CLOSE.

Deleting an Object from the Index Class

When a client requests an object to be deleted from the object store, the index class must be correspondingly updated. This function is performed by calling the new API SimLibDeleteItemPartExtSrch which sets SearchState= SIM_SEARCH_STATE_TOBEDELETED and TimeStamp=NULL. The API is based on the object server API's SimLibDeleteObject and SimLibDeleteItem. The former is used to delete an individual part PartItemID associated with the designated attribute value TextItemID. The latter is used to delete all objects associated with the designated attribute TextItemID. API SimLibDeleteItemPartExtSrch operates on the following parameters.

| | |
|---|---|
| ULONG SimLibDeleteItemPartExtSrch | (HSESSION hSession, PITEMID pszItemID, HOBJ hObj, BOOL bCallExtSrch, PRCSTRUCT pRC) |
| HSESSION hSession: | library session identifier, created by API SimLibLogon which verifies client access and privileges |
| PITEMID pszItemID: | pointer to item ID of preexisting ITEM |
| HOBJ hObj: | pointer to object handle block, corresponds to the part number and text item id number as designated in the object store |
| BOOL bCallExtSrch: | if TRUE, call SimLibProcExtSrch which will activate the object-based search engine to update the index class |
| PRCSTRUCT pRC: | a return code to confirm that API call is successful |

Conditions for the above parameters are as follows. The parameters pszItemID and hObj are mutually exclusive. Use pszItemID with SimLibDeleteItem if an Item stored in the object store is to be deleted with all its parts. Use hObj with SimLibDeleteObj if only specified parts of the Item are to be deleted. NULL the parameters which are not used. The parameters and operations of the DL API's are explained in detail in the VI Reference.

Replacing an Object in the Index Class with an Updated Version

When a client requests an object to be replaced by an updated version in the object store, the index class must be correspondingly updated. This function is performed by calling the new API SimLibReplaceItemPartExtSrch which sets SearchState=SIM_SEARCH_STATE_ TOBEUPDATED and TimeStamp=Null. The API is based on the object server API's SimLibCopyObject and SimLibWriteAttr. The former copies an entire object to another. The latter updates the row information in the attribute table. API SimLibReplaceItemPartExtSrch acts on the parameters following parameters.

| | |
|---|---|
| ULONG SimLibReplacePartExtSrch | ( HSESSION hSession, |
| | HOBJ hDestObj, |
| | HOBJ hSrcObj, |
| | BOOL bCallExtSrch, |
| | PRCSTRUCT pRC) |
| HSESSION hSession: | library session identifier, created by API SimLibLogon which verifies client access and privileges |
| HOBJ hDestObj: | pointer to target object handle block, corresponds to the part number and text item id number as designated in the object store |
| HOBJ hSrcObj: | pointer to source object handle block, corresponds to the part number and text item id number as designated in the object store |
| BOOL bCallExtSrch: | if TRUE, call SimLibProcExtSrch which will activate the object-based search engine to update the index class |
| PRCSTRUCT pRC: | a return code to confirm that API call is successful |

An additional parameter for the existing API SimLib-CopyObject is that fdelete must be TRUE.

Activating the External Search Engine

When one of the above new API's is called through the library client, a Search Manager module user_exit may be synchronously called. The object information is collected and requests Search Manager to index the new information according to the added, deleted or updated text. The user_exit call is used to push Search Manager so that the search engine knows that the indexing task is to be performed. The Search Manager examines the index class and items in the index class will be selected for processing if the corresponding TimeStamp attribute value is not the NULL state and the SearchState attribute value is SIM_SEARCH_STATE_TOBEUPDATED or SIM_SEARCH_STATE_TOBEDELETED.

After a row-object corresponding to the above attribute values is identified by the Search Manager, the search engine sets the time stamp to a current date and time, and the Search Manager schedules requests for updating the index class according to the SearchState attribute for an item. Thus, referential integrity is maintained, documenting changes in both the indexing for the parametrically archived database and the object-based search engine.

An API to activate the Search Manager when information needs to be indexed may be created, using the following parameters.

| | |
|---|---|
| ULONG SimLibProcExtSrch | (HSESSION hSession, |
| | PSZ pszSearchEngine, |
| | PSZ pszSearchIndex, |
| | PITEMID pszItemID, |
| | PSZ pszPartNo, |
| | PRCSTRUCT pRC) |
| HSESSION hSession: | library session identifier, created by API SimLibLogon which verifies client privileges |
| PSZ pszSearchEngine: | pointer to name of Search Engine |
| PSZ pszSearchIndex: | pointer to Search Index |
| PITEMID pszItemID: | pointer to item ID of the part |
| PSZ pszPartNo: | pointer to part no |
| PRCSTRUCT pRC: | a return code to confirm that API call is successful |

If it is desired that the search engine operated in batch mode, the pointers pszSearchIndex, pszItemID, and pszPartNo should be set to NULL.

In the Search Manager, the corresponding function call to activate the search engine is xxxScheduleRequest(), where the prefix is defined by the platform on which Search Manager is operating. The parameters of the function are as follows.

| | |
|---|---|
| ULONG xxxScheduleRequest | (HSESSION hSession, |
| | PSZ pszSearchEngine, |
| | PSZ pszSearchIndex, |
| | PITEMID pszItemID, |
| | PSZ pszPartNo, |
| | PRCSTRUCT pRC) |
| HSESSION hSession: | library session identifier, created by API SimLibLogon which verifies client access and privileges |
| PSZ pszSearchEngine: | pointer to name of Search Engine |
| PSZ pszSearchIndex: | pointer to Search Index |
| PITEMID pszItemID: | pointer to item ID of the part |
| PSZ pszPartNo: | pointer to part no |
| PRCSTRUCT pRC: | a return code to confirm that API call is successful |

When a request for indexing is scheduled by the Search Manager user exit on request of an application, a SM document id is passed together with the request. The document ID has the following structure.

| DLLibServerName | ItemId | PartNumber | SSitemId | LangCode | TimeStamp |
|---|---|---|---|---|---|
| (1) | (2) | (3) | (4) | (5) | (6) |

(1) DL library server
(2) DL item id
(3) DL item part number
(4) DL search service index class
(5) SM language code for the part
(6) Time stamp Although a particular embodiment of the present invention has been shown and described with respect to Search Manager integration with Digital Library, it will be obvious to those skilled in the art that various changes and modifications may be made without departing from the spirit and scope of the present invention. Other database arrangements and object-based search engines may be integrated using a similar method and means as described above and encompassed by the appended claims.

What is claimed is:

1. A method of integrating one or more object-based search engines with an object store to process objects storable therein, wherein the search engine operates on the arrangement of at least one of: character and pixel information of said objects, and wherein the object store contains objects archived using parametric classifiers, each object being associated with at least one of a: part number and an object identification number, said method comprising the steps of:

generating an index class, said index class comprising attributes of a part number, an object identification number, an item identifier, and a search engine identifier, an object being assigned a corresponding value for each attribute and each object being uniquely identifiable by said item identifier attribute;

obtaining an object storable in said object store associated with at least one of a: predetermined part number and object identification number to obtain a selected object;

setting said search engine attribute according to the data type of said selected object;

activating a search engine corresponding to said search engine attribute; and processing said selected object with said activated search engine, wherein said search engine operates on the arrangement of at least one of: said character and pixel information of said selected object.

2. The method of claim 1, wherein said generating step comprises creating a catalog table, wherein the attributes further include a search engine index, used in conjunction with said search engine attribute, each column corresponding to the attributes, and each row corresponding to objects stored in said object store, wherein said object item identification attribute corresponds to an identifier indicating where a set of objects are stored and said part number attribute corresponds to an identifier indicating where an individual object is stored.

3. The method of claim 2, wherein in said generating step, the catalog table further comprises a search state attribute, said method further comprising the step of determining the content of said search state attribute corresponding to said selected object wherein in said processing step, said activated search engine operates on said selected object based on the content of said search state attribute.

4. The method of claim 3, wherein the content of the search state attribute corresponds to one of: an adding function wherein an additional row is added to said catalog table and a new object is written to the object store, a deleting function wherein a row is removed from said catalog table and an object is removed from the object store, and an updating function wherein the contents of a row is edited and a replacement object is added to the object store.

5. The method of claim 4, wherein said activating step comprises supplying an activation command to the search engine.

6. The method of claim 5, wherein said activation command is supplied automatically upon obtaining said selected object.

7. The method of claim 4, wherein in said activating step, the search engine periodically self-activates.

8. A computer usable medium having computer readable program code means embodied therein for integrating one or more object-based search engines with an object store to process objects storable therein, wherein the search engine operates on the arrangement of at least one of: character and pixel information of said objects, and wherein the object store contains objects archived using parametric classifiers, each object being associated with at least one of a: part number and an object identification number, the computer readable program code means comprising:

computer readable program code means for generating an index class, said index class comprising attributes of a part number, an object identification number, an item identifier, and a search engine identifier, an object being assigned to a corresponding value for each attribute and each object being uniquely identifiable by said item identifier attribute;

computer readable program code means for obtaining an object storable in said object store associated with at least one of a: predetermined part number and object identification number to obtain a selected object;

computer readable program code means for setting said search engine attribute in said index class according to the data type of said selected object;

computer readable program code means for activating a search engine corresponding to said search engine attribute;

computer readable program code means for directing said activated search engine to said selected object; and computer readable program code means for processing said selected object according to the arrangement of at least one of: said character and pixel information of said selected object.

9. The medium of claim 8, wherein said index class generating program code means creates a catalog table, wherein the attributes further include a search engine index, used in conjunction with said search engine attribute, each column corresponding to the attributes, and each row corresponding to objects stored in said object store, wherein program code means for directing said activated search engine comprises said object item identification attribute, corresponding to an identifier indicating where a set of objects are stored, and said part number attribute, corresponding to an identifier indicating where an individual object is stored.

10. The medium of claim 9, wherein in said index class generating program code means creates a catalog table including a search state attribute, said medium further comprising a computer readable program code means for determining the content of said search state attribute corresponding to said selected object and inputting said information to said catalog table, and wherein said code means for processing said selected object operates based on the content of said search state attribute.

11. The method of claim 10, wherein the content of the search state attribute corresponds to one of: an adding function wherein an additional row is added to said catalog table and a new object is written to the object store, a deleting function wherein a row is removed from said catalog table and an object is removed from the object store, and an updating function wherein the contents of a row is edited and a replacement object is added to the object store.

12. The medium of claim 11, wherein said activating program code means supplies an activation command to the search engine.

13. The method of claim 12, wherein said activating program code means automatically executes concurrent with the execution of said program code means for obtaining said selected object.

14. The medium of claim 11, wherein in said activating program code means sets a flag value and said search engine periodically checks said flag value to self-activate.

* * * * *

UNITED STATES PATENT AND TRADEMARK OFFICE
CERTIFICATE OF CORRECTION

PATENT NO. : 5,802,524
DATED : Sept. 1, 1998
INVENTOR(S) : Flowers et al

It is certified that error appears in the above-identified patent and that said Letters Patent is hereby corrected as shown below:

<u>Column 4</u>
Line 46, delete "time" from the fourth column of the chart, and insert --time-- in the seventh column of the chart; and
Line 56, delete "is".

<u>Column 5</u>
Line 61, delete "dexClassO" and insert --dexClass( )--.

<u>Column 6</u>
Line 67, after "Details are", insert --set forth in the VI reference.--

<u>Column 10</u>
Line 18, delete "xxxSchedule Requesto" and insert --xxxSchedule Request( )--.

Signed and Sealed this

Twenty-first Day of March, 2000

*Attest:*

*Attesting Officer*

Q. TODD DICKINSON

*Commissioner of Patents and Trademarks*